United States Patent

[11] 3,573,389

[72] Inventors Martin R. Greenstein
Villa Park, Ill.;
Alfred Zarouni, Middletown, N.J.

[21] Appl. No. 784,749
[22] Filed Dec. 18, 1968
[45] Patented Apr. 6, 1971
[73] Assignee Bell Telephone Laboratories, Incorporated
Murray Hill, N.J.

[54] SWITCHING SYSTEM WITH INDIVIDUAL REGISTER CONTROL
19 Claims, 3 Drawing Figs.

[52] U.S. Cl. ........ 179/18
[51] Int. Cl. ........ H04m 3/54
[50] Field of Search ........ 179/18 AD, 18.02, 18.03

[56] References Cited

UNITED STATES PATENTS 3,206,554 9/1965 Kandel et al. ........ 179/18(AD)
3,334,190 8/1967 Jenkins et al. ........ 179/18(AD)

*Primary Examiner*—William C. Cooper
*Assistant Examiner*—David L. Stewart
*Attorneys*—R. J. Guenther and James Warren Falk

ABSTRACT: Special services, such as call transfer and abbreviated dialing, are provided by auxiliary circuits each uniquely associated with certain subscriber lines in a common control-switching system. The auxiliary circuit is arranged with shift registers to recognize the dialing of a predetermined code and to respond thereto by releasing and reenabling the common control switching equipment. On abbreviated dialing calls, the return of dial tone by the reenabled central office register enables the auxiliary circuit to outpulse the directory number of the desired station. On transfer calls, after dialing the access code, the subscriber primes the transfer feature by dialing the directory number of the transfer station. This number is then simultaneously stored in the auxiliary circuit and in the reenabled central office register. In either situation the call then progresses to completion in the normal manner.

INVENTORS
M. R. GREENSTEIN
A. ZAROUNI
BY
David Tannenbaum
ATTORNEY

SWITCHING SYSTEM WITH INDIVIDUAL REGISTER CONTROL

BACKGROUND OF THE INVENTION

This invention relates generally to telephone switching systems and more particularly to switching network arrangements within such systems wherein certain subscriber stations are arranged for special services treatment.

DESCRIPTION OF THE PRIOR ART

Extensive development of switching systems in recent years has made possible the provision of numerous special features which render telephone service more convenient and more flexible. For example, circuit arrangements have been provided whereby a special services subscriber, who is to be absent from his telephone for some period of time, may have incoming calls diverted to some other station during such absence. Another example of special services is a circuit arrangement whereby a subscriber may have a call completed to another subscriber station by dialing only a limited number of digits.

In existing special services systems the commonly shared central office switching equipment is arranged to recognize the distinct status of the special services line and to provide unique treatment for connections involving that line. This treatment is, by definition, different from the treatment given to other lines served by the switching equipment. An example of a most recent improvement in the call transfer area of special services is described in the T. R. Stevens application, Ser. No. 737,923, filed Jun. 18, 1968. As set forth therein, the common control switching equipment at the central office is arranged to recognize the dialing by the special services subscriber of a special two-digit code signifying that the subscriber is about to place in memory a directory number of a station to which incoming calls are to be temporarily directed. The common control equipment is modified to recognize this code and to thereupon recycle in order to accept the directory number of the transfer station. Similar modifications are made to the central office switching equipment when the abbreviated dialing feature is provided.

In situations where only a few of the subscribers who are served by a switching system require special services treatment the expense involved in modifying the switching machine to accommodate these subscribers becomes prohibitive. Thus, while there are valid technical and economical reasons for denying such services to certain telephone stations while extending the services to other stations, sound public policy and economic necessity dictate that such a situation may not prevail.

A most recent example of a switching system arranged to provide special services to individual subscribers without extensive modification to the central office switching equipment serving these subscribers is A. E. Joel, Jr. application, Ser. No. 668,530, filed Sept. 18, 1967. The Joel application, although a substantial contribution to prior art switching arrangements, highlights the deficiency of the existing art in the area of special services switching systems when the demand for such services is limited. The Joel disclosure teaches a switching system arrangement whereby an auxiliary circuit is interposed between the special services subscriber and the local central office. Each auxiliary circuit is also connected to a separate supervisory switching system centrally located between a number of other local central offices. On each connection involving a special services line, the associated auxiliary circuit interrogates a supervisory memory to determine whether special services treatment is required. Upon an affirmative response the auxiliary circuit is arranged to disassociate the subscriber's line from the local central office and to connect the line instead to the supervisory switching system. In Joel, modification to the switching equipment at each local central office has been thus eliminated. However, no provision has been made for situations where the combined special services requirements of all the switching centers in a given area remain relatively limited, thereby rendering the establishment of a supervisory switching network economically undesirable.

In vie of the foregoing, an object of this invention is to provide a special services switching arrangement which may be simply and economically implemented in existing systems so as to obviate the necessity for modification to these systems when certain stations served therefrom are arranged for special services treatment.

A further object is to provide a switching arrangement which will permit the provision of special services features by all central offices irrespective of the specific type of office involved.

A still further object is to provide a switching system easily controllable by a special services subscriber without necessitating modifications or additions to the existing switching network.

SUMMARY OF THE INVENTION

These and other objects are obtained in accordance with an exemplary embodiment of the invention wherein special service features, such as temporary call transfer and abbreviated dialing, are provided to subscriber stations served by a central office without necessitating additions or changes to the commonly shared equipment at such offices. An auxiliary circuit is individually associated with each special services station and is arranged to recognize the dialing of a predetermined code and to respond thereto by releasing and reenabling the common control-switching equipment. On abbreviated dialing calls the return of dial tone by the reenabled central office register enables the auxiliary circuit to outpulse the directory number of the desired station. On transfer calls, after dialing the access code, the special services subscriber primes the transfer feature by dialing the directory number of the transfer station. This number is then simultaneously stored in the auxiliary circuit and in the reenabled central office register. In either situation the call then progresses to completion in the normal manner.

In accordance with one feature of the invention, special service features are provided to subscribers served by a central office without the addition of equipment to such central office and without modification of existing equipment within such central office.

In accordance with another feature of the invention, each special services station served by a common controlled telephone switching system is arranged with an auxiliary circuit responsive to the receipt of predetermined signals from the station for releasing and reestablishing connections to the commonly shared switching equipment.

In accordance with still another feature of the invention, a telephone switching system is arranged with auxiliary circuits individually associated with each special services subscriber line responsive to the receipt of predetermined signals over the line for releasing and reestablishing dial tone connections from that line to the commonly shared registration equipment and operative upon the receipt of second dial tone from the registration equipment for transmitting thereto previously stored information.

In accordance with still another feature of this invention, a telephone switching system is arranged with auxiliary circuits individually associated with each special services subscriber line responsive to the receipt of predetermined signals over the line for releasing and reestablishing dial tone connections from that line to the commonly shared registration equipment and operative upon receipt of second dial tone from the registration equipment for recording signals transmitted from the associated station.

DESCRIPTION OF THE DRAWING

The foregoing objects, features and advantages, as well as others of the invention, will be more apparent from the following description of the drawing, in which.

Figure 2:
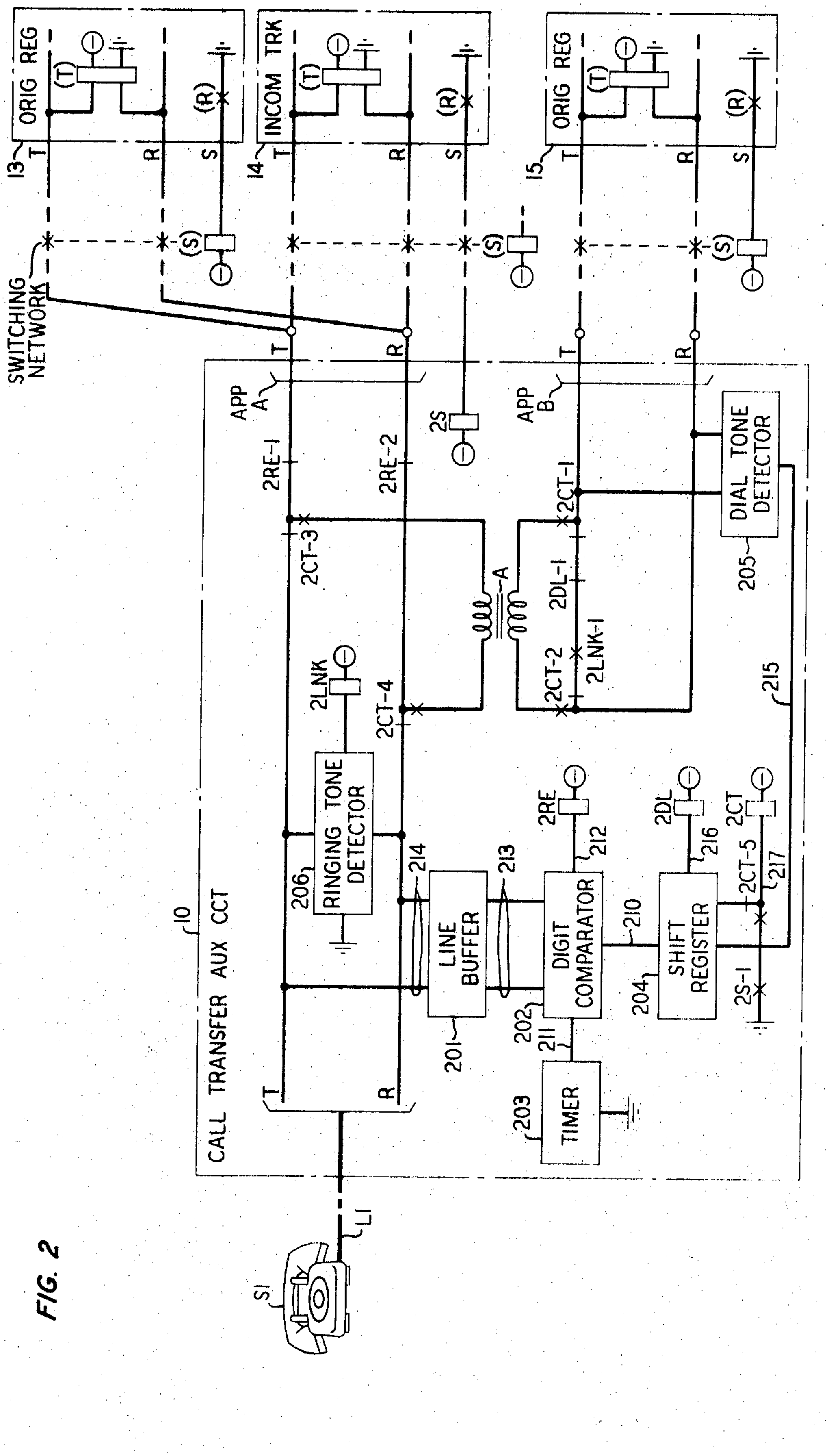
FIGS. 2 and 3 are schematic drawings showing in greater detail the interrelation of the components of the exemplary embodiment.
Figure 3:
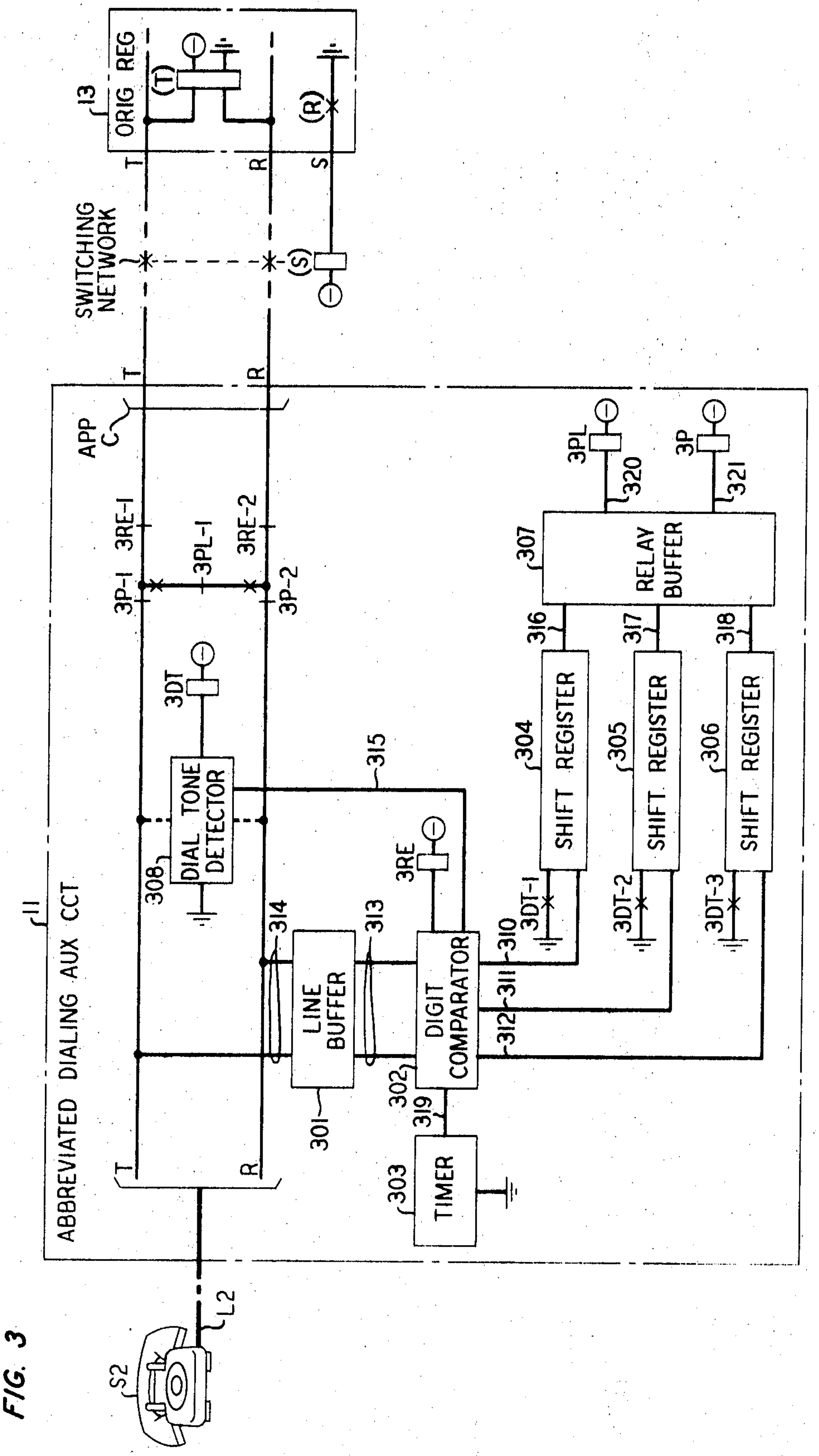

It will be noted that FIGS. 2 and 3 employ a type of notation referred to as "detached contact" in which an "X" shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505—513.

It will also be noted that in order to simplify the disclosure and thus facilitate a more complete understanding of the embodiment, the relays, relay contacts and other electromechanical devices shown in FIGS. 2 and 3 have been given systematic designations. Thus, the number preceding the letters of each device corresponds to the FIG. in which the control circuit of the device is shown. Thus, the coil of relay 2LNK is shown in FIG. 2. Each relay contact, either make, break or transfer, is shown with its specific contact number preceded by the designation of the relay to which it belongs. For example, the notation 2LNK–1 indicates contact number 1 of relay 2LNK the coil of which is shown in FIG. 2.

INTRODUCTION

The present invention is illustrated in an automatic switching system wherein common control circuits are employed to control the establishment of calls through a switching network. One such system is disclosed in the A. J. Busch U.S. Pat. No. 2,585,904, issued Feb. 19, 1952. It is to be understood that the present invention is not, however, limited to use in a telephone system of this type but may be utilized in other types of switching systems.

The invention is described herein as being embodied in a telephone system of the type disclosed in the cited Busch patent. The invention is particularly concerned with apparatus in call transfer auxiliary circuit 10 and abbreviated dialing auxiliary circuit 11. The equipment units of the Busch system are neither shown nor described in detail herein except where necessary for a complete understanding of the invention. The cited Busch patent may be consulted for a complete understanding of the construction and operation of other components of the Busch disclosure.

For purposes of illustration, it is intended that the apparatus of line link frame (LLF) 16, trunk link frame (TLF) 17, outgoing trunk 12, originating registers 13 and 15, incoming trunk 14, marker 18 and number group circuit 19 be similar to the corresponding apparatus disclosed in the Busch Patent.

In order to facilitate an understanding of the invention, the description of the operation of the exemplary embodiment has been subdivided into a general description portion designated 1.00 and a detailed description designated 2.00. Section 1.00 and its subsections describe the invention in general terms with respect of FIG. 1 and section 2.00 and its subsections describe the invention in detail with respect to FIGS. 2 and 3.

1.00 GENERAL DESCRIPTION

The interrelation and function of the equipment units of the exemplary embodiment will now be described with respect to FIG. 1, wherein the interconnection of the circuit blocks has been designated by arrows to indicate the direction of circuit action.

For purposes of illustration, we shall assume that a subscriber at station S1 anticipates a need to utilize a temporary call transfer feature which is available to that station. We shall assume also for illustrative purposes, that subscriber station S2 is arranged for the special services abbreviated dialing feature. Although in the embodiment each subscriber station is shown as being arranged only for one special services feature it is understood, as will be more apparent from that which is contained hereinafter, that any subscriber station advantageously may be arranged with either of these services or with both services.

1.1 INITIATION OF THE TEMPORARY CALL TRANSFER FEATURE

Figure 1:
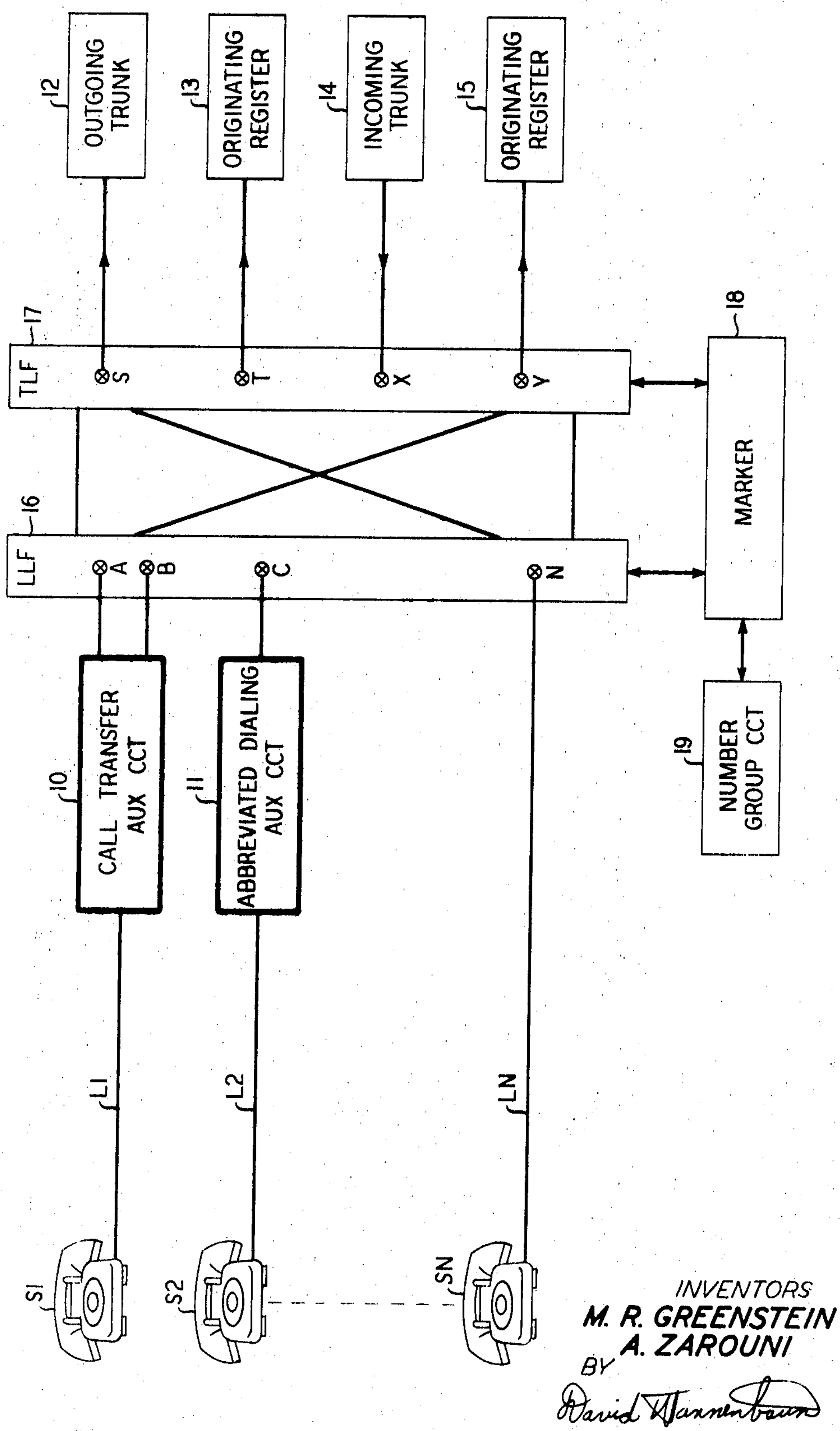
FIG. 1 is essentially a block diagram showing the interrelation of the exemplary embodiment of the invention.

Referring now to FIG. 1, when station S1 goes off-hook marker 18 is arranged as described in the aforementioned Busch patent, to connect line link frame appearance A with trunk link frame appearance T in the normal manner such that digits transmitted from station S1 over line L1 and call transfer auxiliary circuit 10 will be received in originating register circuit 13. As set forth in the Busch patent, marker 18 then causes the registration of the class of service and the calling line equipment location of station S1, appearance A of call transfer auxiliary circuit, in the originating register. The marker thereupon releases from the connection.

Dial tone is returned to subscriber station S1 from originating register 13 in the well-known manner upon completion of the aforesaid linkage. At this point, we assume that the subscriber at station S1 has knowledge of a special code which signifies, in a manner to be more fully set forth hereinafter, that the digits which will follow are to be stored in the call transfer auxiliary circuit for future use as a transfer number. For purposes of illustration, we shall assume further that the code which initiates the call transfer feature is "11." However, it should be noted at this point that although a two-digit code is utilized in the embodiment the call transfer auxiliary circuit may be arranged to accept any type of signal, any digit or any other combination of digits as an identification code.

Accordingly, upon receipt of dial tone from originating register 13 a subscriber tat station S1 dials the digits "1" and "1" into the register. Call transfer auxiliary circuit 10 is arranged, in the manner to be more fully detailed hereinafter, to monitor the calling line and to respond to the transmission of this two-digit code by momentarily opening the linkage connection to originating register 13. Accordingly, upon line appearance A of call transfer auxiliary circuit 10 becoming open, originating register 13 is released from the linkage connection in the manner set forth in the above-mentioned Busch patent. Upon reclosure of the line link frame appearance of call transfer auxiliary circuit 10 marker 18 again establishes a dial tone connection to an available originating register, such as originating register 13, in the manner set forth previously. Accordingly, upon receipt of the second dial tone the subscriber at station S1 transmits the digits corresponding to the directory number of the transfer station. In the manner to be more fully detailed hereinafter, these digits are stored in call transfer auxiliary circuit 10 for future use in directing calls incoming to subscriber station S1 to the subscriber station associated with the recorded transfer number.

At this point it should be noted, that the originating register also contains the directory number of the transfer station and upon completion of the dialing interval the originating register enables the establishment of a calling connection from subscriber station S1 to the transfer station. The purpose of this connection is to insure that the subscriber at the transfer station is notified that calls which would otherwise be directed to station S1 will be transferred temporarily to that station.

1.2 INCOMING CALL CONNECTED TO THE TRANSFER STATION

We shall assume, at this point, that incoming trunk circuit 14 is activated by an incoming call which is directed to station S1. As set forth in detail in the Busch patent, when marker 18 receives the called line information, number group circuit 19 is interrogated so as to determine the line equipment information and ringing combination of the called party. In the instant case, upon so doing, the marker is arranged to establish a linkage connection from incoming trunk 14, appearance X on trunk line frame 17, to station S1, appearance A on line link frame 16. Upon establishment of this linkage connection, the marker releases and ringing tone potential is transmitted to the subscriber station S1 in the normal manner. Call transfer auxiliary circuit 10 is arranged to immediately detect ringing potential on line L1 and to thereupon cause appearance B on line link frame 16 to appear as an off-hook condition to marker 18. Accordingly, marker 18, in the manner previously discussed and as set forth in the above-mentioned Busch patent for originating calls, is again selected and connects appearance B of call transfer auxiliary circuit 10 to an available originating register, such as originating register 15. The marker thereupon releases from the connection.

The return of dial tone from the commonly shared switching equipment enables call transfer auxiliary circuit 10, in the manner to be more fully detailed hereinafter, to transmit the previously stored directory number of the transfer station to the attached originating register. Upon receipt of this transfer number the originating register enables a completing marker in the well-known fashion as fully detailed in the Busch patent. The called line directory information is transmitted from the register to the marker and the call is completed in the normal manner as described therein.

1.3 REMOVAL OF THE TRANSFER NUMBER FROM MEMORY

The special services subscriber at station S1 may, at any time, resume the termination of incoming calls at that station by transmitting a preselected release code, in the manner set forth previously, to the call transfer auxiliary circuit 10. For purposes of illustration, it is assumed that the release transfer code is "12." Therefore, upon transmission of the digits "1" and "2" from station S1, the call transfer auxiliary circuit 10, in the manner to be more fully detailed hereinafter, causes the removal of the transfer directory number stored therein. Immediately thereafter all incoming calls to station S1 will be completed in the normal fashion as previously set forth.

1.4 INITIATION OF THE ABBREVIATED DIALING FEATURE

We shall assume, at this point, that the subscriber at station S2 desires to place an abbreviated dialing call. When station S2 goes off-hook a linkage is established, as discussed previously, to an available originating register, such as originating register 13, such that digits transmitted from station S2 will be transmitted via line L2 and abbreviated dialing auxiliary circuit 11, through the switching network to originating register 13. For purposes of illustration, we shall assume further that the code which initiates the abbreviated dialing feature is "21." However, it should be noted at this point, that although a two-digit code is utilized in the embodiment, the abbreviated dialing auxiliary circuit may be arranged to accept any type of signal, any digit or any combination of digits as an identification code.

Accordingly, upon receipt of dial tone from originating register 13, a subscriber at station S2 dials the digits "2" and "1" into the register. As will be more apparent from that which is contained hereinafter, abbreviated dialing auxiliary circuit 11 is arranged to detect the transmission of this two-digit code and to thereupon momentarily open the linkage connection to the originating register. Accordingly, in the manner previously discussed, originating register 13 is released from the connection at this point. Upon the reclosure of the calling line, the marker 18 establishes a second dial tone connection from an available originating register, which we assume to be originating register 13, to abbreviated dialing circuit 11. The auxiliary circuit 11 is arranged to detect the return of dial tone and to thereupon transmit to the originating register the full directory number, previously stored therein associated with the two-digit code "21."

Upon receipt of this transfer number, the originating register enables a completing marker as set forth previously, and the received directory information is transmitted from the register to the marker. The call is then completed from station S2 to the station associated with the selected two-digit code in the normal manner as described in the aforementioned Busch patent.

2.00 DETAILED DESCRIPTION

The following text will describe the embodiment of the invention in detail with reference to FIGS. 2 and 3. A cursory examination of these FIGS. will reveal that certain contacts and relay designations have been enclosed in parentheses. The parenthetical symbol has been employed to facilitate a clear understanding of the invention by indicating that the apparatus which is enclosed therein is shown more fully in the earlier cited Busch disclosure. Relay designations and contact designations which are unique to the instant embodiment are not enclosed in parentheses and, as will be more apparent from that which is contained hereinafter, are shown in complete detail.

We shall assume, as hereinbefore set forth, that station S1 is arranged for temporary call transfer and that station S2 is arranged for abbreviated dialing. We shall assume further that a subscriber at station S1 desires to have incoming calls transferred to some other telephone location and that a subscriber at station S2 desired to place a call to a station by dialing a two-digit code instead of the complete directory number of the desired subscriber station.

2.1 INITIATION OF THE TEMPORARY CALL TRANSFER FEATURE

Upon an off-hook condition of the subset at station S1, marker 18 is seized by line link frame 16 in the manner identical to that set forth in detail in the earlier cited Busch patent. Since marker 18 is seized by line link frame 16 only in conjunction with a dial tone request, marker 18 prepares to obtain that information necessary for the completion of a dial tone, namely, the class of service and the line equipment number of the associated line.

As set forth in the Busch patent, upon receiving the aforementioned information, the marker 18 (shown on FIG. 1) establishes a linkage between the line equipment location associated with the calling line and an available originating register, such as originating register 13 on trunk line frame 17. The marker 18 thereupon transfers to the originating register 13 the line equipment location together with the class of service designation of station S1. Having recorded the aforesaid information, as well as other data pertinent to the subsequent handling of the call in originating register 13, the marker 18 releases so as to be available to serve other calling connections.

Turning now to FIG. 2, upon the establishment of a linkage connection between the originating register 13 and the calling subscriber at station S1 a continuous communication path is extended from the subset of station S1 through call transfer auxiliary circuit 10, leads T and R, released break contacts 2CT-3, 2CT-4, 2RE-1 and 2RE-2 and via appearance A to the originating register. Dial tone is returned in the well-known manner to signify that the calling station may commence transmission of the necessary digital information.

At this point we shall assume that the subscriber at station S1 has knowledge of the two-digit code "11" which in a manner to be more fully detailed hereinafter, is recognized by the call transfer auxiliary circuit 10 as an initiation of the call transfer feature.

Thus, upon receipt of dial tone, the subscriber at station S1 generates the digits "1" and "1" in sequence as a manifestation of a request that station S1 thereafter be provided with the call transfer special services feature. The aforesaid two digits are transmitted over line L1 and through call transfer auxiliary circuit 10 and appearance A and registered in the originating register 13. Concurrent with registration in the originating register these digits are also monitored by the auxiliary circuit 10 and transmitted through line buffer 201, which may be any one of the circuit configurations well known in the art operative to pass certain signals while blocking other signals, to digit comparator 202 which circuit advantageously may be arranged in any one of the well-known circuit configurations operative to sequentially register digits transmitted over a pair of lines. Digit comparator 202 is further arranged to match the registered digits with a preset code, such as code "11" and to provide an output when these digits match.

For simplicity of disclosure we shall assume that a subscriber has been informed that where a two-digit code is not followed by subsequent digits within a predetermined interval of time, such as, for example, 10 seconds, the aforesaid code will be recognized as a transfer number storage request. We shall therefore assume that this interval of time transpires and timer 203, which advantageously may be arranged in any one of the well-known circuit configurations operable to provide an output a predetermined interval of time after receiving input information and further operable to maintain that output for a certain predetermined interval of time, provides a ground to digit comparator 202. Since digit comparator 202 now contains a match between the dialed digits "1" and "1" and the preset code "11" a circuit path is completed for the operation of relay 2RE.

The enabling of relay 2RE opens the linkage connection from the call transfer auxiliary circuit 10, appearance A, to the originating register via enabled break contacts 2RE–1 and 2RE–2. Accordingly, since the line link frame appearance of call transfer auxiliary circuit 10 now appears open to the common control switching equipment, originating register 13 is released in the well-known manner as fully detailed in the Busch patent. The digits "1" and "1" which had been received from subscriber station S1 upon initiation of the call transfer feature and stored in originating register 13 are now released so as to enable the originating register 13 to be selected for other dial tone connections.

Timer 203, after maintaining the output for a predetermined time, such as 5 seconds, releases digit comparator 202 which, in turn, releases relay 2RE. Upon releasing, digit comparator 202 opens an information path to shift register 204, the purpose of which will become more apparent from that which is contained hereinafter.

Relay 2RE releasing, closes the line link frame appearance A of call transfer auxiliary circuit 10 via now released break contacts 2RE–1 and 2RE–2 so as to enable the common control switching equipment to again establish a linkage connection through the switching network to an available originating register, which we shall assume to be originating register 13. Accordingly, as set forth previously, upon reestablishment of this linkage connection, dial tone is returned through the switching network via appearance A of call transfer auxiliary circuit 10, released break contacts 2RE–1, 2RE–2, 2CT–3 and 2CT–4, over the T and R leads and line L1 to subscriber station S1.

Upon receipt of dial tone, the subscriber at station S1 transmits to the originating register the directory number of the subscriber station to which calls are to be temporarily transferred. These digits are stored in originating register 13 in the normal manner as set forth in the Busch patent. Concurrent therewith, the dialed digits are also transmitted through line buffer 201 and digit comparator 202 to the now enabled shift register 204 which may be any one of the well-known circuit configurations operable to store signal combinations and to nondestructively outpulse the stored information upon receipt of the proper signal. Upon completion of the dialing, the directory number of the transfer station is stored in shift register 204 of call transfer auxiliary circuit 10, the purpose of which will become more apparent from that which is contained hereinafter.

Originating register 13, upon receiving all of the transmitted digits from subscriber station S1 is arranged, as fully detailed in the aforementioned Busch patent, to enable a completing marker and to transfer thereto the call completion information as received from call transfer auxiliary circuit 10 and subscriber station S1. A connection is thereupon established from subscriber station S1 in the well-known manner, as described in the Busch patent, to the subscriber station associated with the transmitted directory number. The subscriber at station S1 may thereupon inform the subscriber at the transfer station that for an interval of time, calls which would otherwise be directed to station S1 will be transferred to station S2.

Digressing momentarily, it should be noted at this point, however, that in the event the subscriber at station S1 does not desire to communicated with the transfer station such as, for example, when it is known that the transfer subscriber is not available, the calling subscriber may return the subset to the on-hook position, thereby releasing the originating register and the common control equipment in the well-known manner.

Summarizing briefly at this point, the transmission of a predetermined two-digit code from subscriber station S1 is detected by call transfer auxiliary circuit 10 which responds thereto by opening the linkage connection to the common control switching equipment. The attached originating register, which also contains the dialed digits, is thereby released. A certain interval of time thereafter the linkage connection from the auxiliary circuit to the switching equipment is reestablished, thereby returning second dial tone to the calling subscriber. The digits corresponding to the transfer number are then transmitted from subscriber station S1 to the originating register and are concurrently stored in shift register 204 of call transfer auxiliary circuit 10. The purpose of this storage function will become more apparent from that which is to follow.

2.2 INCOMING CALL CONNECTED TO THE TRANSFER STATION

Assuming that an incoming call were to arrive via incoming trunk 14, an incoming register (not shown) will be attached to receive the called line directory number as set forth in detail in the Busch patent. As further described in detail in the Busch patent, a marker, such as marker 18, is thereupon seized and the calling line directory number forwarded thereto by the incoming register which then releases. As set forth in detail in the Busch patent a number group, such as number group circuit 19, (FIG. 1) is seized by marker 18 to translate this directory number information into the physical number equipment location of the called station. A linkage connection is thereupon established from incoming trunk 14 through the switching network to appearance A of call transfer auxiliary circuit 10 and ringing potential is applied in the well-known manner to the called line.

Ringing potential on leads T and R of appearance A of call transfer auxiliary circuit 10 enables ringing tone detector 206, which may comprise any one of a number of circuit configurations well known in the art operable to detect ringing voltage impressed upon the T and R leads. Accordingly, relay 2LNK is operated from ground through the enabled ringing tone detector 206 and the winding of the relay to battery.

Relay 2LNK operating closes the T and R leads of appearance B of the call transfer auxiliary circuit via a path which extends from lead T of appearance B through released break contacts 2CT–1 and 2DL–1, enabled make contact 2LNK–1 and released break contact 2CT–2 to the R lead of appearance B. Accordingly, upon closure of call transfer auxiliary circuit 10 appearance B, a linkage connection is established through the switching network to an available originating register such as originating register 15 in the manner set forth previously. Upon establishment of this linkage connection, dial tone is returned through the switching network and over the T and R leads of appearance B. The presence of dial tone potential on the T and R leads enables dial tone detector 205, which may be arranged in any one of the well-known configurations operable to provide ground at the output whenever a tone of a certain type, such as dial tone, is present at the input. The enabling of dial tone detector 205 provides a start signal to shift register 204 which enables the shift register in the manner to be more fully detailed hereinafter to transmit the information previously stored therein.

The receipt of ground from the dial tone detector 205 causes shift register 204 to control relay 2DL in accordance with the directory number contained therein such that pulses corresponding to dial pulses are generated in the well-known manner on the T and R leads of appearance B via the enabling and releasing of break contact 2DL–1. Since the pattern of the pulsing is determined by the directory number previously stored in the shift register 204 by the subscriber at station S1, originating register 15 receives the station number to which calls directed to station S1 are to be transferred. Upon completing the outpulsing of the directory number, shift register 204 enables the operation of relay 2CT. Relay 2CT operating causes the T and R leads of appearance B to be connected to the T and R leads of appearance A so as to form a communication path through the call transfer auxiliary circuit via enabled transfer contacts 2CT–1 and 2CT–2, inductor A, enabled transfer contacts 2CT–3 and 2CT–4 and released break contacts 2RE–1 and 2RE–2.

Originating register 15, after receiving the directory digits from the call transfer circuit, appearance B, proceeds to enable the establishment of a calling connection to the transfer station in the well-known manner as detailed fully in the Busch patent. Upon the subscriber at the transfer station going off-hook in response to ringing tone Potential applied to the line, a communication connection is established from the transfer station via an outgoing trunk, such as outgoing trunk 12 (shown in FIG. 1), through appearance B of call transfer auxiliary circuit 10 and via the aforementioned communication path through the auxiliary circuit to appearance A, over the previously established linkage connection via incoming trunk 14 to the calling party. Communication then proceeds between the calling party and the transfer party in the normal manner.

Summarizing briefly, a call incoming to subscriber station S1 via appearance A of the call transfer auxiliary circuit, which is serially inserted between the switching network and the called stations, enables the seizure, via appearance B of the auxiliary circuit, of an available commonly shared originating register. Upon establishment of a linkage to the register, the auxiliary circuit transfers thereto the directory number of the transfer station as previously received from the station S1. A communication connection is then extended from appearance B to the transfer station under control of the switching network. This connection is bridged through the auxiliary circuit to the original incoming connection so as to allow communication to proceed between the calling subscriber and the subscriber at the transfer station.

2.3 REMOVAL OF THE TRANSFER NUMBER FROM MEMORY

A special services subscriber at station S1 may remove the transfer number from the call transfer auxiliary circuit at any time and thus resume the termination of incoming calls to that station. As previously set forth, it is assumed that the release transfer code which must be transmitted by the subscriber for this purpose is "12." The subscriber's line, upon going off-hook, is connected in the manner previously set forth to an originating register, such as originating register 13. The calling subscriber thereupon transmits the digits "1" and "2" which are stored in the originating register and concurrently registered in digit comparator 202 in call transfer auxiliary circuit 10. Digit comparator 202 compares the dialed code with a preset code and, upon detection of a match, enables relay 2RE in the manner previously described, causing appearance A of the call transfer auxiliary circuit to appear open to the switching network. The opening of the T and R leads of appearance A causes the release of the commonly shared switching equipment as set forth previously. Concurrent with the enabling of relay 2RE, digit comparator 202 provides a release pulse for shift register 204, thereby removing the transfer directory number stored therein. The release of relay 2RE closes the A appearance of the call transfer auxiliary circuit so as to establish a second dial tone connection through the switching network from an available originating register to station S1. The return of dial tone to the subscriber at station S1 is an indication that the erase function has been completed. Incoming calls directed to station S1 will now be terminated thereto in the normal manner.

2.4 INITIATION OF THE ABBREVIATED DIALING FEATURE

We shall assume at this point, that the subscriber at station S2 desires to place an abbreviated dialing call. We shall assume further, that the subscriber at station S2 has knowledge of certain two-digit codes, each of which is uniquely associated with the particular directory number of another subscriber station. For purposes of illustration, we shall assume that these coded numbers are "20," "21" and "22." However, as will be more apparent from that which is contained hereinafter, any combination of signals or digits may be utilized to initiate the abbreviated dialing function.

Turning now to FIG. 3, when station S2 goes off-hook, a dial tone linkage is established over line L2 and the T and R leads through abbreviated dialing auxiliary circuit 11, released break contacts 3P–1, 3P–2, 3RE–1, and 3RE–2, and appearance C, through the switching network to an available originating register, such as originating register 13. Upon return of dial tone, the subscriber at station S2 transmits the digits "2" and "0" which correspond to a particular directory number previously associated therewith in the manner to be more fully detailed hereinafter. These digits are stored in originating register 13 in the manner previously set forth. Concurrent therewith, the digits are also transmitted through line buffer 301, which circuit may be arranged in any one of the configurations well known in the art operative to pass certain signals, to digit comparator 302, which circuit advantageously may be arranged in any one of the well-known configurations operative to sequentially register digits transmitted over a pair of lines. Digit comparator 302 is further arranged to compare the registered digits with a preset code such as code "20" and to provide an output when these codes match.

As set forth previously for simplicity of disclosure, we shall assume that the subscriber has been informed that where a two-digit code is not followed by subsequent digits within a predetermined interval of time, such as, for example, 10 seconds, the aforesaid code will be recognized as an abbreviated dialing request. We shall therefore assume that this interval of time transpires and timer 303, which advantageously may be arranged in any one of the well-known circuit configurations operable to provide an output a predetermined interval of time after receiving input information and further operable to maintain that output for a certain predetermined interval of time, provides a ground to digit comparator 302, thereby completing a circuit for the operation of relay 3RE in the manner previously discussed.

The enabling of relay 3RE in the abbreviated dialing auxiliary circuit 11 opens the T and R leads of appearance C to the originating register via enabled break contacts 3RE–1 and 3RE–2. Accordingly, as previously discussed, since the line link frame appearance of abbreviated dialing auxiliary circuit 11 now appears open to the switching equipment, the originating register is released. The digits "2" and "0" which had been stored in the originating register are thereby released so as to enable the originating register to be selected for other dial tone connections.

After the passage of a certain interval of time, timer 303 releases, thereby releasing digit comparator 302 and relay 3RE. Relay 3RE releasing reenables a linkage connection via release break contacts 3RE–1 and 3RE–2 through the switching network to an available originating register, such as originating register 13. Prior to releasing, digit comparator 302 prepares an enabling path for the shift register corresponding to the dialed code "20" which, for illustrative purposes, we shall assume to be shift register 304.

Digressing momentarily, it should be noted that each of the shift registers 304, 305 and 306 is arranged in the manner previously set forth for shift register 204, and each contains a separate directory number of a subscriber station. Although only three such registers are shown in the embodiment, any number of registers may be utilized in actual practice.

Returning now to FIG. 3, as set forth previously for purposes of illustration, we have assumed that shift register 304 is arranged to be actuated in response to the dialing of digits "2" and "o," by the subscriber at station S2. Accordingly, shift register 304 contains the directory number of the station to which the subscriber at station S2 desires to be connected.

The return of dial tone through the switching network from originating register 13 to appearance C of the abbreviated dialing circuit 11 enables dial tone detector 308, which may be arranged in any one of the well-known circuit configurations operable to provide a ground at the output upon detecting a special tone, such as dial tone, at the input. The enabling of relay 3DT provides ground to each shift register 304, 305 and 306 via enabled make contacts 3DT–1, 3DT–2 and 3DT–3, respectively. It will be recalled at this point, that digit comparator 302, prior to releasing, prepared an operate path for shift register 304 such that upon application of ground from enabled make contact 3DT–1, shift register 304 outpulses the directory number stored therein. Relay buffer 307 is operable upon receipt of pulses from shift register 304 to enable relay 3P for the duration of the outpulsed digits, and to operate and release relay 3PL in accordance with the digital information outpulsed from shift register 304.

The enabling of relay 3P removes the subscriber line L2 from the linkage connection to the switching network via enabled transfer contacts 3P–1 and 3P–2. Relay 3PL pulsing in response to the outshifted directory number, provides a series of pulses corresponding to dial pulses via contact 3PL–1 to the originating register through appearance C of the circuit 11, released break contacts 3RE–1 and 3RE–2, and enabled transfer contacts 3P–1 and 3P–2. Accordingly, the directory number of the desired station, which had been stored in shift register 304, is transmitted from abbreviated dialing auxiliary circuit 11 to originating register 13 in response to the dialing of the digits "2" and "0" by the subscriber at the station S2.

Upon completion of the shifting function relay buffer 307 releases relays 3PL and 3P, thereby reconnecting subscriber station S2 to the linkage connection from the switching network via released transfer contacts 3P–1 and 3P–2, and released break contacts 3RE–1 and 3RE–2.

Upon receipt of this transfer number the originating register enables a completing marker in the manner set forth previously, and as fully detailed in the aforementioned Busch patent, and the called line directory information is transferred thereto from the register. A calling connection is thereupon completed in the normal manner, as described in the aforementioned Busch patent, from station S2 to the station associated with the abbreviated dialing code "20."

2.5 CHANGING OF THE ASSOCIATED ABBREVIATED DIALING DIRECTORY NUMBER

As set forth previously, it has 30," assumed that the directory numbers contained in each of the shift registers 304, 305 and 306 are each uniquely associated with a particular two-digit code and that each directory number has been prerecorded therein. In the event the special services subscriber desires to change any of the available directory numbers, the digits "30", "31" and "32" are dialed to accomplish this function. For purposes of illustration, we shall assume that the digits "30," "31" and "32" correspond to a request for a change in the directory number contained in shift registers 304, 305 and 306, respectively. For illustrative purposes, we shall assume further that the subscriber at station S2 desires to change the number stored in register 304, which, as will be recalled, is outpulsed in response to receipt of the abbreviated dialing code "20."

Accordingly, the digits "3" and "0" are transmitted from station S2, which, in the manner set forth previously, are compared to preset codes by digit comparator 302. Upon the enabling of timer 303 and the detection of a match between the received digits "30" and the preset code "30" an inhibit signal is provided by digit comparator 302 to dial tone detector 308, the purpose of which will be more fully appreciated from that which is to follow. Concurrent therewith relay 3RE is enabled, thereby opening the T and R leads to the switching network in the manner set forth previously.

After a preset time, timer 303 releases digit comparator 302 which, in turn, provides a reset pulse for shift register 304 and also reestablishes a dial tone connection from the central office. The return of second dial tone signifies to the subscriber that the digits corresponding to the new directory number which are to be stored in the shift register 304 may now be transmitted. Since, as previously noted, the dial tone detector 308 is inhibited at this time the directory number stored in the register is not outpulsed to the central office. Upon completing the transmission of these digits the subscriber at station S2 returns the subset to its on-hook position. The abbreviated dialing auxiliary circuit is thereupon arranged to respond to the dialing of the digits "2" and "0" from subscriber station S2 by establishing a calling connection to the directory number currently stored therein in shift register 304.

2.6 CONCLUSION

While the equipment of this invention has been shown in a particular embodiment wherein, without necessitating modifications to the central office switching equipment, calls incoming to subscriber stations are transferred to other stations in accordance with information previously transmitted from the called station and wherein certain stations may complete calls to other stations by dialing an abbreviated code, it is to be understood that such an embodiment is intended only to be illustrative of the present invention and numerous other arrangements may be devised by those skilled in the art without departing from the spirit and scope of the invention.

We claim:

1. In a communication switching system:
- a plurality of stations each comprising means for transmitting signals;
- first and second register means for concurrently receiving transmitted signals;
- means responsive to an off-hook condition of one of said stations for seizing said first register means;
- means responsive to the transmission of said signals for enabling said second register means to receive said transmitted signals; and
- means in said second register means responsive to receipt of a certain combination of said signals for releasing said seized first register means and for reseizing said first register means.

2. The invention as described in claim 1 wherein said second register means further comprises means responsive to said reseizing first register means for transmitting signals.

3. In a communication switching system a plurality of subscriber stations each comprising:
- means for selectively transmitting signals;
- first register means at said switching network available to all said stations for receiving transmitted signals;
- a plurality of second register means each uniquely associated with certain of said stations for receiving transmitted signals;
- means responsive to the off-hook state of any of said certain stations for seizing said first register means and for enabling said second register means to receive transmitted signals; and means in said second register means responsive to receipt of a certain combination of said signals for releasing said seized first register means and for reseizing said first register means.

4. The invention as set forth in claim 3 wherein said second register means further comprises means responsive to said reseizing first register means for transmitting thereto a predetermined combination of said signals.

5. The invention as set forth in claim 3 wherein said second register means further comprises means for storing a plurality of predetermined signal combinations and means for selectively enabling the transmission of any one of said stored signal combinations.

6. In a telephone switching system having a plurality of calling and called stations:

switching network means;

a plurality of lines extending from said network;

a plurality of stations connected to said lines;

control means for establishing connections through said network;

a common control register in said control network seized in response to an off-hook condition of said stations for receiving connection completing information from said stations; and an arrangement for providing special services on certain of said lines comprising auxiliary circuit means individually associated with said certain lines for detecting the transmission of predetermined information over said associated line and means responsive to said detected transmission for releasing and reseizing said common control register.

7. The invention as set forth in claim 6 wherein additional information is transmitted over said associated line in response to said reseized common control register and wherein said auxiliary circuit means is further arranged for storing said transmitted additional information.

8. The invention as set forth in claim 7 wherein said auxiliary circuit signal further comprises:

means for detecting the establishment of connections to said associated line;

means responsive to the enabling of said connection detecting means for seizing a common control register; and means in said auxiliary circuit responsive to said enabled common control register for transmitting thereto said stored additional information.

9. The invention as set forth in claim 6 wherein said auxiliary circuit means further comprises means responsive to said reseized common control register for transmitting thereto predetermined connection completing information.

10. An auxiliary circuit for providing a special service feature in a communication switching system having a plurality of uniquely designated stations, and register means operable to receive unique designations from any seized one of said stations and for enabling connections from a seized one of said stations to a station associated with received ones of said unique designations, wherein said auxiliary circuit comprises:

a plurality of storage register, each containing a unique designation of one of said stations;

means responsive to receipt of a predetermined code for selecting one of said storage registers and for releasing and reseizing said register means; and means responsive to said reseized register means for transmitting thereto the unique designation contained in said selected storage register.

11. The invention as set forth in claim 10 wherein said unique designations contained in each of said storage means are selectively controllable by a said station exclusively associated with each said auxiliary circuit.

12. The invention set forth in claim 10 wherein said unique designations consist of a set of digits, said storage registers comprise shift register circuits operable to serially record received ones of said digits from a said station associated with said auxiliary circuit, digit comparator means operable to detect a match between a predetermined set of digits and a received set of digits and means responsive to a said detected match for selectively enabling the serial recording of digits in one of said shift register circuits.

13. An auxiliary circuit for connection in a telephone system having a plurality of stations for transmitting call directing signals and having originating register means for receiving said signals, said circuit comprising:

auxiliary register means for storing predetermined call directing information call directing signaling means;

detecting means for detecting the transmittal of at least one predetermined call directing signal;

means responsive to said detecting means for causing release of said originating register means;

means for causing a reseizure of said originating register means; and means responsive to said reseizure of said originating register means for causing said auxiliary register means to operate said call directing signaling means in accordance with said stored call directing information.

14. An auxiliary circuit in accordance with claim 13 wherein said means responsive to said reseizure of said originating register means includes dial tone detecting means.

15. An auxiliary circuit in accordance with claim 13 wherein said auxiliary circuit includes output means operable for seizing said originating register means, ringing tone detector means and means responsive to said ringing tone detector means for enabling said output means.

16. An auxiliary circuit in accordance with claim 15 further comprising dial tone detector means operable to detect seizure of said originating register via said enabled output means and means responsive to said detected seizure for enabling said auxiliary register means in accordance with said call-directing information.

17. An auxiliary circuit in accordance with claim 16 further comprising means responsive to said auxiliary register means for establishing a communication connection between said first and said second output means.

18. An auxiliary circuit in accordance with claim 14 wherein said auxiliary circuit includes a single output means and said signaling means includes means bridged across said output means.

19. An auxiliary circuit in accordance with claim 18 wherein said auxiliary register means includes a plurality of shift registers and said detecting means detects distinct call directing signals individual to each of said shift registers.